3,706,573
FRIED RICE PRODUCT AND PROCESS FOR
PRODUCING SAME
Raymond C. Tolson, Sr., Napa, and Raymond C. Tolson, Jr., Woodland, Calif., assignors to G.T. Products, Inc., Woodland, Calif.
No Drawing. Filed June 24, 1970, Ser. No. 49,507
Int. Cl. A23l 1/10, 1/18
U.S. Cl. 99—80 R      5 Claims

ABSTRACT OF THE DISCLOSURE

A fried rice food product is produced by feeding raw rice into a hot (350–420° F.) oil bath. The rice is fried therein for a period of from 5 to 20 seconds after which the rice is immediately removed from the hot oil bath and the excess oil adhering to the rice grains is drained therefrom while the rice cools to room temperature.

BACKGROUND OF THE INVENTION

In recent years there has been an enormous increase in the demand for "convenience" foods, that is, foods which are processed prior to consumer sale to make them easier to prepare in terms of time and labor. In this regard rice has traditionally been considered, at least by western cooks, as rather difficult and time-consuming to prepare. It must be cooked for a relatively long period of time in precise quantities of water and then permitted to stand prior to serving. Failure to observe any step in the preparation process results either in hard underdone kernels, or in a starchy, glutinous mass which is unappetizing at best.

In order to eliminate this finicky cooking of rice, various methods have been devised to pretreat the kernels in order to make the preparation process simple and less subject to error. Such processes as "rice conversion" and "quick rice" have been devised wherein the rice is "pre-cooked" in one manner or another to prepare a product that can easily be processed by the housewife for serving. Such processes however, invariably involve pre-cooking the rice with steam or water with subsequent drying of the cooked product prior to packaging. Some such processes even involve complete cooking of the rice to a soft mass and subsequent extrusion chopping into simulated "rice grains."

In general these "conversion" or "pre-cooking" processes alter the texture and flavor of the rice to some extent, all of which alterations are not necessarily desirable.

SUMMARY OF THE INVENTION

Now a process has been invented in which the raw rice is "fried" at a relatively high temperature for a short period of time to produce a product which is simply and easily cooked to yield flavorable, separate, attractive rice kernels for serving at a meal.

In general, the process of the invention comprises placing raw rice kernels into a hot oil bath and frying the rice kernels therein for a very short period of time. The "fried" rice kernels are quickly removed from the hot oil bath, the excess surface oil clinging to the kernels is removed and the kernels are permitted to cool to room temperature. The cool kernels are then packaged for ultimate sale to the consumer.

The rice produced by this process is not completely "cooked" or "fried" in the usual sense, since it is necessary to subject the rice product to further cooking with water just prior to consumption, however, the "fried" product is definitely altered in appearance and edibility from raw rice. It is quite "milky" and opaque in appearance as opposed to raw rice which is shiny and translucent. Further the rice kernels are rather crunchy and have a flavor somewhat reminiscent of "pop-corn" although when cooked in water as described hereafter, the product has a true rice flavor.

In addition the "fried" rice product of the invention can be stored for long periods of time without deterioration or the development of rancidity. When desired, the product is very quickly and simply cooked with water to produce a completely edible and attractively flavored rice.

It is therefore an object of the invention to produce a rice product which can be quickly and simply prepared for consumption.

It is another object of the invention to produce a fried rice product that may be packaged and maintained on a grocer's shelf for long periods of time.

It is another object of the invention to produce a fried rice product that can be quickly and simply cooked with water to produce rice that forms clean separate kernels free from the starchy, glutinous attributes sometimes found if rice is cooked by ordinary methods.

It is still a further object of the invention to provide a method for preparing a "fried" rice product.

Other objects and advantages of the invention will become apparent upon review of the following specification and the claims appended hereto.

Now describing the invention process in greater detail, raw milled white rice having a water content of some 15% or less is placed into a feeder unit. The feeder unit is disposed above a hot oil bath such that the rice grains are fed directly thereinto. In any event the raw rice grains are fed into an oil bath wherein the temperature of the oil is maintained at from 350° F. to about 420° F., although under ideal conditions the oil temperature should be about 385° F., or as close thereto as possible.

After being introduced into the hot oil the rice grains are fried therein for a period of from about 5 to 20 seconds, but preferably between 7 and 14 seconds, after which the grains are immediately removed from the hot oil and conveyed away from the bath for cooling and draining of the excess oil therefrom.

After the excess oil is drained from the rice and it has cooled to room temperature, it is placed into suitable containers which are thereafter sealed and stocked for later shipment.

Although the rice may be fried by a batch process, it is desirable to prepare the product in a continuous processing apparatus since large quantities of rice can thereby be prepared in a short period of time.

One such apparatus consists of a raw rice feeder, for instance, a vibratory hopper disposed over a shallow hot oil bath. A rice conveyer mechanism is submerged a few inches below the surface of the hot oil and leads to an exit funnel emerging from the oil bath. An auger mechanism passes through the funnel which has screen walls to permit drainage of excess oil from the processed rice. The auger passes to a cooling table, from whence a second conveyer passes to the packaging area.

Raw rice is dropped from the hopper directly into the hot oil which is continually circulated through the shallow bath at the temperature previously noted. The frying rice is conveyed through the hot oil and into the exit auger all within a period of a few seconds, e.g., 7 to 14. The total frying time is controlled by regulating the speed of the conveyer, but in any event, at the temperature contemplated herein, a frying time of from about 7 to 14 seconds is sufficient to prepare the desired product.

The hot fried rice is then augered up from the hot oil bath through the screen funnel section where the centrifugal force developed in the auger section helps in separating the excess liquid oil from the fried rice grains. The excess drains through the screened section back into the bath section where it is eventually reused.

The rice, now essentially free of excess oil is then conveyed to the cooling table where it is permitted to return to room temperature, after which it is reconveyed to the package filling section, where it is packed into suitable containers.

The oil used for frying the rice may be selected from any number of edible oils, such as peanut oil, safflower oil, corn oil, or the like. It is only necessary that the oil be edible and reasonably resistant to oxidation at the temperature utilized in the invention process.

The rice produced by the invention process loses approximately 5% by weight of its initial moisture content during the frying process. On the other hand the rice picks up oil approximately 8% of its initial weight, whereby the rice gains weight by several percent during the process. As noted previously, the rice assumes a chalky white appearance after the frying process and under magnification presents a rather porous aspect. The rice remains in individual kernels and increases in volume by some 50 to 60% over the raw untreated rice.

The temperature of the oil in the frying bath is quite critical since too high a temperature will result in the explosive emission of moisture from the rice causing the kernels to crack and shatter and thus yield an undesirable product. Further, too high an oil temperature tends to brown the rice and change the flavor. On the other hand too low an oil temperature results in incomplete frying of the rice kernels or necessitates an excessively long cooking time with concurrent decrease in the production rate.

The rice product has a "shelf" life in the package commensurate with raw milled rice. Prior to actual consumption, the rice product must be further cooked with water to provide a thoroughly cooked, palatable rice dish. Preferably the rice product may be prepared for consumption as follows:

The desired measured quantity of rice is removed from the package and is placed into an equal quantity of rapidly boiling water. Boiling of rice and water is continued for approximately two minutes, after which the heat is removed and the rice is permitted to stand while covered, for about ten additional minutes. The rice is now ready to serve. It is quite similar to correctly cooked milled rice, in that the rice separates cleanly and uniformly into individual grains and there is no starchiness or stickiness. The flavor is also quite similar to plain cooked milled rice, with perhaps a slightly nuttier flavor. Of course, as in the case of plain cooked rice, spices and/or condiments may be added to the cooked rice as desired.

There has been disclosed herein, the preferred method for producing the rice product of the present invention, however it will be readily apparent that variations thereof may be employed to produce the same without departing from the spirit of the invention, and all such variations are meant to be included herein insofar as they fall within the scope of the claims set forth below.

What is claimed is:

1. A method for producing a fried rice product comprising introducing raw rice kernels into a hot bath of edible oil, said oil being at a temperature of 350° to 420° F., frying said rice kernels in said hot oil bath for a period of from 5 to 20 seconds until said rice has added thereto about 8% by weight, based on the initial rice weight, of said oil, removing rice kernels from the said bath, separating the excess surface oil from said kernels, and cooling the fried kernels to produce the rice produce.

2. The method of claim 1 wherein the oil bath is maintained at a temperature of about 385 degrees Fahrenheit.

3. The method of claim 1 wherein the rice kernels are fried in the oil bath for a period of from about 7 to 14 seconds.

4. The method of claim 1 wherein above 5% by weight, water, based on the initial rice weight, is removed from said rice during said frying step.

5. The product of the process of claim 1.

References Cited

UNITED STATES PATENTS 3,600,192   8/1971   Tanaka _____ 99—80 R

RAYMOND N. JONES, Primary Examiner